Jan. 13, 1970     A. E. BUTCHER     3,488,804
MATCHED MOLD AND SIZING ROD TO FORM PARISONS
Filed March 13, 1967     2 Sheets-Sheet 2
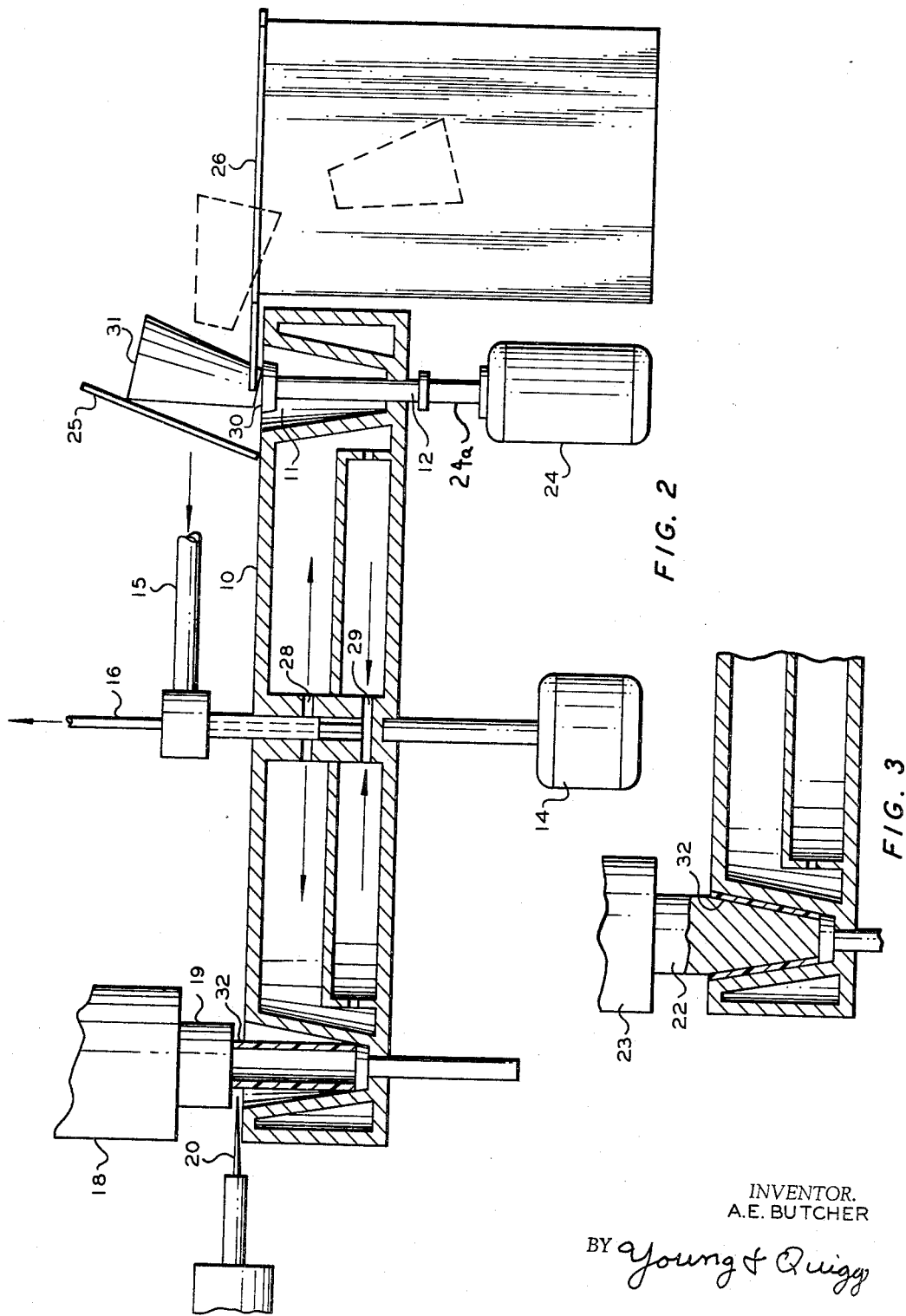
INVENTOR.
A.E. BUTCHER
BY Young & Quigg
ATTORNEYS

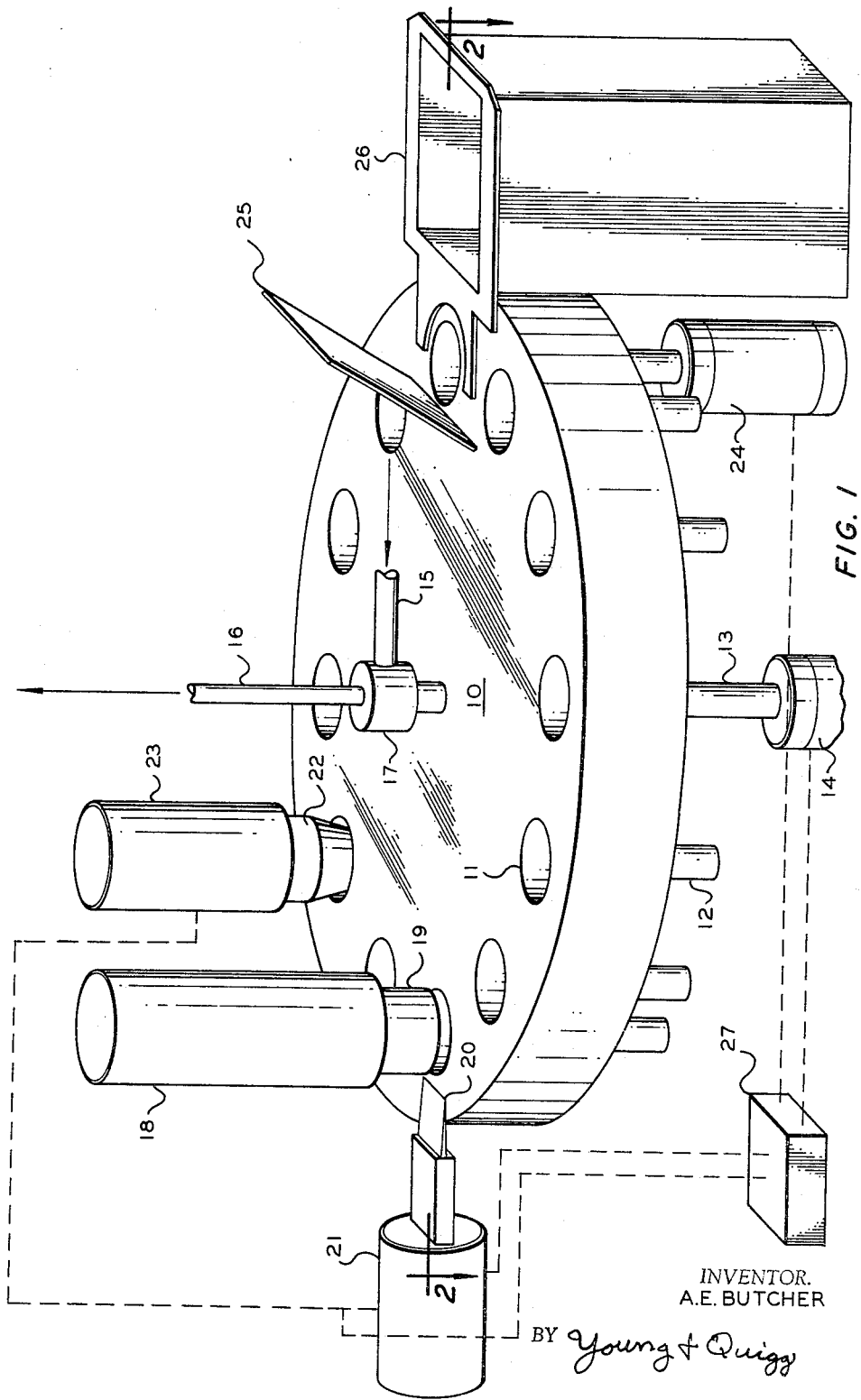

United States Patent Office 3,488,804
Patented Jan. 13, 1970

3,488,804
MATCHED MOLD AND SIZING ROD TO FORM PARISONS
Alvin E. Butcher, Bartlesville, Okla., assignor to Phillips Petroleum Company, a corporation of Delaware
Filed Mar. 13, 1967, Ser. No. 622,613
Int. Cl. B29c 3/02
U.S. Cl. 18—5                2 Claims

ABSTRACT OF THE DISCLOSURE

Smooth surfaced preformed thermoplastic parisons for the production of plastic bottles are formed by placing a hot thermoplastic tube within a mold chamber and forcing a sizing rod axially through the tube to thereby cause it to expand to the shape of the cavity. The formed parison is then cooled and ejected from the mold.

---

This invention relates to the molding of preformed parisons. In another aspect, this invention relates to an apparatus for producing smooth surfaced thermoplastic parisons for oriented plastic containers.

Conventionally, containers of thermoplastic material are formed by expanding a molten thermoplastic tube to conform to the shape of the interior of a mold zone. It has recently been discovered that thermoplastic containers of superior strength and durability can be produced by forming a thermoplastic parison after it has first been heated to its orientation temperature.

In this regard, it is known that the greatest orientation of the plastic is obtained when the parison is expanded while in the crystalline state at a temperature between the crystalline melting point and the crystalline freezing point. Generally, these orientation temperatures will be in the range from 2 to 40° F. below the crystalline melt point of the polymers. The crystalline freezing point is the temperature at which maximum crystalline formation occurs upon cooling of molten polymer, and the crystalline melting point is the temperature at which evidence of crystallinity disappears upon heating a sample of polymer from a cooled crystalline condition. Ordinarily, the latter temperature is several degrees above the crystalline freezing point. The crystalline freezing point of polymers can be determined by melting a sample of polymer, inserting a thermocouple in the molten polymer and allowing the polymer to cool slowly. The temperature is recorded and plotted on a chart versus time. The crystalline freezing point is the first plateau in the time versus temperature curve. The crystalline melting point of polymers can be determined by heating a small piece of plastic (usually film) under crossed polaroids in a microscope equipped with means for heating the polymer. The specimen is heated slowly and the melting point is the temperature at which birefringence disappears. For maximum orientation, it is desirable to cool the material below the crystalline freezing point and then reheat it to the proper orienting temperature. For polypropylene this orientation temperature will lie in the range between 300 and 338° F. For polyethylene the range will be between 237 and 271° F.

Thus, when producing oriented plastic bottles, it is desired to first form parisons by extrusion, etc., which are subsequently cooled and then reheated to the orientation temperature of the plastic and then placed in a molding device and expanded to the desired shape at the orientation temperature.

It has been found that if the surface of the parison has defects due to bubbles from entrapped air, scratches or rough areas, then the advantages obtained by orienting the bottle will be lost because the above surface defects will result in weak areas on the container wall. Thus, it is imperative that the preformed parison have no surface defects either on the inside or the outside surface.

Therefore, one object of this invention is to provide an improved apparatus for production of plastic objects.

A further object of this invention is to provide a novel apparatus for forming smooth surfaced parisons for the use in the production of oriented thermoplastic containers.

According to the invention, smooth surface parisons for use in the production of oriented plastic bottles are produced by extruding hot thermoplastic tubes within cooled mold chambers having highly polished surfaces. A polished sizing rod is then forced axially through each tube to cause it to expand and be pinched between the interior surface of the mold cavity and the exterior surface of the sizing rod. The sizing rod is removed and the formed parison is ejected from the mold cavity when it has been sufficiently cooled. Preferably, both the sizing rod and the mold chambers are conical in shape.

This invention can be more easily understood from a study of the drawing in which FIGURE 1 is a perspective view of the preferred apparatus of the invention, FIGURE 2 is a sectional view taken along lines 2—2 of FIGURE 1 with some elements removed. FIGURE 3 is a sectional view illustrating the sizing rod of FIGURE 1 in moved position.

Referring now to FIGURE 1, there is illustrated a perspective view of the preferred apparatus of this invention. As illustrated, there is a plurality of mold cavities 11 radially spaced adjacent the periphery thereof. Each mold cavity carries an ejector rod 12 attached to an ejector piston (not shown in FIGURE 1). Turret 10 rests on spindle 13 which is in turn rotated by motor 14. Turret 10 is provided with a series of internal cooling cavities, and mold cavities 11 cooled by a coolant which enters via line 15 and leaves via line 16. Lines 15 and 16 connect to turret 10 by roto coupling 17.

Extruder 18 can be any type extruding device known in the art such as a screw type arrangement of a positive displacement piston type which extrudes thermoplastic material from annular die 19 into an adjacent mold cavity. Cut-off blade 20 is preferably a very thin blade attached to air cylinder 21 and serves to shear off the extrudate adjacent annular die 19. It is preferred that the shearing action of blade 20 be relatively fast in order that the extrudate be sheared evenly with the outlet annular die 19 during a constant extrusion rate, without deforming appreciably the shape of the open end of the extruded tube segment. Cylinder 21 can be any type air or hydraulic cylinder known in the art which will control the lateral movement of cut-off blade 20.

Sizing rod 22 contained within cylinder 23 is positioned adjacent extruder 18 and above turret 10. Cylinder 23 can be similar to cylinder 21. Sizing rod 22 is illustrated as a conical shaped rod. When sizing rod 22 is of conical shape as illustrated, the inner configuration of each mold cavity 11 must also be of conical shape (as illustrated in FIGURES 2 and 3). It is also preferred that the outer surface of sizing rod 22 in the mold cavities 11 be highly polished so that when the extruded tube is pressed therebetween smooth inner and outer surfaces on the tube will therefore result. However, it must be noted that this apparatus can be used to produce cylindrical shaped parisons by providing polished cylindrical shaped mold cavities and a cylindrically shaped expandable sizing rod. Such a sizing rod could comprise a cylindrical steel rod enclosed in an inflatable diaphragm of silicone rubber, or the like. The sizing rod would be inserted within the extruded tube and the diaphragm inflated by a suitable forming fluid to push the thermoplastic wall between the mold cavity and the rubber diaphragm. The diaphragm would then be deflated and the rod removed from the mold cavity.

Ejector cylinder 24 containing a push rod (not shown in FIGURE 1) actuates ejector rod 12 and serves to remove the formed parisons from each of the mold cavities. Deflector plate 25 guides the formed object into bin 26 after ejection. It is noted that bin 26 can be replaced by any suitable product removal means such as a continuous belt arrangement. The action of ejection elements 24, 12, 25, and 26 will be explained more fully in connection with the description of FIGURE 2 below. It must be noted that the relative positions of ejector cylinder 24, deflector plate 25 and bin 26 is not intended to limit the scope of this invention. For example, it is many times desirable to place the above elements adjacent extruder 18 so that the formed objects within mold cavities 11 can be cooled for longer periods of time. Thus, the relative positions of the above elements will depend upon the coolant rate and temperature, the extruder speed, and the diameter of the turret.

As illustrated in FIGURE 1, timer 27 controls the index speed of motor 14, and the actuation of cylinders 21, 23 and 24. With a constant rate of extrusion, timer 27 controls the relative cycle of operation as follows: the first mold cavity is filled with a predetermined length of hot thermoplastic tubing; cut-off blade 20 is actuated to sever the annular shaped extrudate even with annular die 19; turret 10 rotates to place an empty cavity 11 under annular die 19; sizing rod 22 is actuated to form the extruded tube into the desired shape; and ejection cylinder 24 is actuated to cause a cooled preformed parison to be ejected into bin 26.

FIGURE 2 is a sectional view of FIGURE 1 taken along lines 2—2 with some elements removed to further illustrate the operation of this invention. Mold cavities 11 are shown as permanent conical shaped cavities; however, these cavities can be removable sleeves to provide parisons of various lengths and shapes. As illustrated, a coolant such as tap water enters line 15 and flows into the cooling jacket via conduits 28. The coolant circulates around mold cavities 11 and out through line 16 via conduits 29.

Ejection cylinder 24 is shown actuated in FIGURE 2 with push rod 24a forcing ejection rod 12 and piston 30 upward from the bottom of the mold cavity 11 which is adjacent bin 26. This action will force cooled parison 31 upward against deflector plate 25 and into bin 26.

As also illustrated in FIGURE 2, extruder 18 has extruded thermoplastic tube 32 into mold cavity 11 which is adjacent extruder 18. The relative positions of cut off blade 20 and extruder die 19 are also illustrated in FIGURE 2. It is noted that the fact of extruder die 19 is positioned as close as possible to turret 10 so that a minimum gap of extruded thermoplastic material results between the top of mold chambers 11 and the face of annular die 19, but not so close that extruded material from the extruder which is running at a constant rate will strike turret 10 as it indexes.

FIGURE 3 is an illustration partly in section of sizing rod 22 in the extended position. As shown, sizing rod 22 during its downward movement forced thermoplastic tube 32 to conform to the expanded conical form. As stated, it is preferred that the exterior surface of sizing rod 22 and the surface of mold cavities 11 be highly polished so that as thermoplastic tube 32 is squeezed therebetween a very smooth evenly formed parison will result. Also, in many high speed operations it is desirable to utilize a temperature controlled sizing rod. It is generally necessary to keep the sizing rod cooler than the hot thermoplastic material in order to prevent the thermoplastic material from sticking on the exterior thereof. The temperature of sizing rod 22 can be maintained relatively constant by the action of a coolant material circulated therethrough or by the placement of cooling coils therein in any suitable manner known in the art. However, as stated, the necessity for controlling the temperature of the sizing rod 22 will only be present when the operation of turret 10 is at such high speeds that the temperature of sizing rod 22 will approach the temperature of the hot thermoplastic material extruded from annular die 19.

The following is an example of a typical high speed commercial parison forming operation of the apparatus of this invention wherein it is desired to form 4½ inch long parisons of about .76 ounce in weight at a uniform extruder rate of 100 pounds per hour. Turret 10 carries 80 mold cavities and indexes at 2.3 minutes per revolution. Tap water at 60–70° F. flows at two gallons per minute through turret 10. The extrudate temperature will be from 350–400° F. Under these conditions, the cooling time is 2 minutes, and ejection cylinder 24 is placed 350° from extruder 18. It is readily seen under these conditions that the apparatus will yield 35 fully formed parisons per minute. This example is given for illustrative purposes only and it is apparent that various extrusion speeds and indexing rates can be utilized with the apparatus of this invention.

Various modifications and alterations of this invention will become apparent to those skilled in the art from the foregoing description and accompanying drawing without departing from the scope and spirit of this invention, and it should be understood that this invention is not to be limited unduly to that set forth herein for illustrative purposes.

I claim:
1. A parison forming apparatus comprising in combination: a horizontally positioned turret means; a plurality of sizing molds vertically positioned on said turret means and radially spaced adjacent the periphery thereof, each of said molds having a first larger opening, a second smaller opening and tapered walls therebetween; means to rotate said turret means; means for cooling said walls of said sizing molds; an extrusion means positioned vertically above said turret, said extrusion means having an annular die for extruding open end tubing of molten thermoplastic material directly into one of said sizing molds; means to shear said tube at the face of said die; sizing rod means tapered to match said sizing molds, said sizing rod means being positioned vertically above said turret and so disposed that said sizing molds adapted to have said tubing extruded therein move under said sizing rod means; an ejection means comprising a piston, the peripheral walls of which are adjacent said walls of said sizing mold at a point adjacent said smaller opening; and means to move said sizing rod into and out of said sizing molds to form said parison, said sizing rod being adapted to move downwardly until a bottom face thereof is adjacent a top face of said piston.

2. Apparatus according to claim 1 wherein said walls of said sizing mold and said sizing rod means have smooth, polished surfaces.

References Cited

UNITED STATES PATENTS

| 2,952,034 | 9/1960 | Fortner. |
|---|---|---|
| 3,069,725 | 12/1962 | Root. |
| 3,270,117 | 8/1966 | Hobson. |
| 3,324,509 | 6/1967 | Hey et al. |

WILBUR L. McBAY, Primary Examiner

U.S. Cl. X.R.

18—19, 20